US012593123B2

(12) United States Patent
Mine et al.

(10) Patent No.: US 12,593,123 B2
(45) Date of Patent: Mar. 31, 2026

(54) SYSTEM CONSISTING OF ELECTRONIC DEVICE AND NOTIFICATION APPARATUS, CONTROL METHOD THEREOF, AND ELECTRONIC DEVICE AND NOTIFICATION APPARATUS

(71) Applicant: CANON KABUSHIKI KAISHA, Tokyo (JP)

(72) Inventors: Yosuke Mine, Tokyo (JP); Takashi Ichimiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 18/479,962

(22) Filed: Oct. 3, 2023

(65) Prior Publication Data

US 2024/0121506 A1 Apr. 11, 2024

(30) Foreign Application Priority Data

Oct. 6, 2022 (JP) ................................. 2022-161831

(51) Int. Cl.
*H04N 23/66* (2023.01)
*G08B 21/18* (2006.01)
(52) U.S. Cl.
CPC .............. *H04N 23/66* (2023.01); *G08B 21/18* (2013.01)
(58) Field of Classification Search
CPC ....... H04N 23/66; H04N 23/611; G08B 21/18
USPC ...................................................... 348/211.2
See application file for complete search history.

(56) References Cited

U.S. PATENT DOCUMENTS

| | | | | |
|---|---|---|---|---|
| 11,470,244 | B1 * | 10/2022 | Tham | ..................... G02F 1/137 |
| 2003/0133018 | A1 * | 7/2003 | Ziemkowski | ........ H04N 23/662 |
| | | | | 348/E5.029 |
| 2003/0193576 | A1 | 10/2003 | Fujii | |
| 2014/0362245 | A1 * | 12/2014 | Tachiwa | ............... H04N 23/661 |
| | | | | 348/211.2 |
| 2015/0054965 | A1 * | 2/2015 | Sudo | .................... H04N 23/611 |
| | | | | 348/169 |
| 2021/0271325 | A1 | 9/2021 | Seo | |

FOREIGN PATENT DOCUMENTS

| | | | |
|---|---|---|---|
| JP | 2005-173328 A | 6/2005 | |
| JP | 2019-191435 A | 10/2019 | |
| JP | 2019191435 | * 10/2019 | ............. H04N 5/225 |

* cited by examiner

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

A system includes an electronic device having an image sensor that performs shooting by controlling an exposure period of performing photoelectric conversion on incident light and accumulating charge by using electronic shutter and a notification apparatus capable of communicating with the electronic device. Information indicating at least either of an exposure start timing and an exposure end timing of the image sensor is transmitted from the electronic device to the notification apparatus, and notification is performed in the notification apparatus according to at least either of the exposure start timing and the exposure end timing based on the information transmitted from the electronic device.

14 Claims, 7 Drawing Sheets

F I G. 4
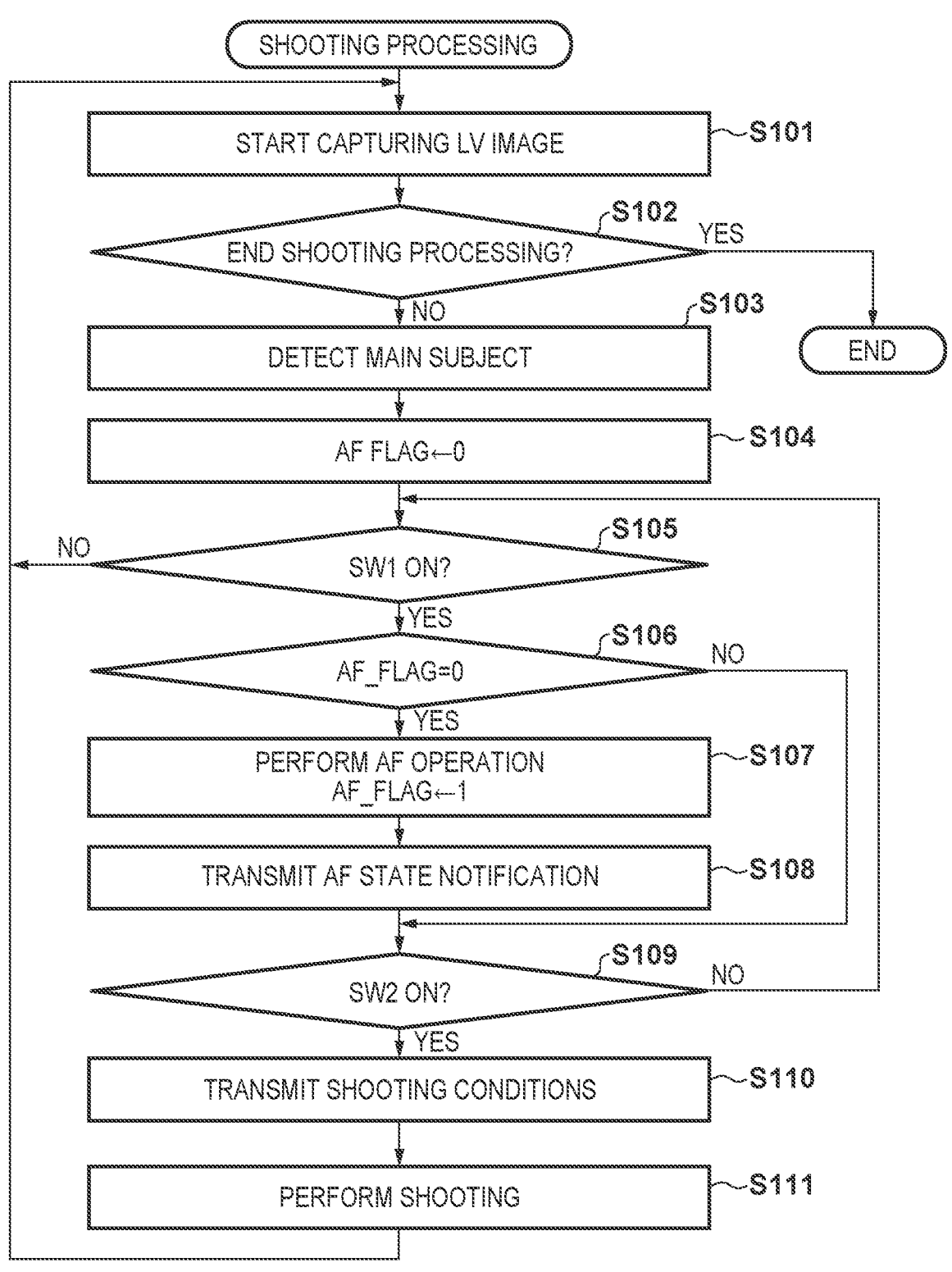

F I G. 5
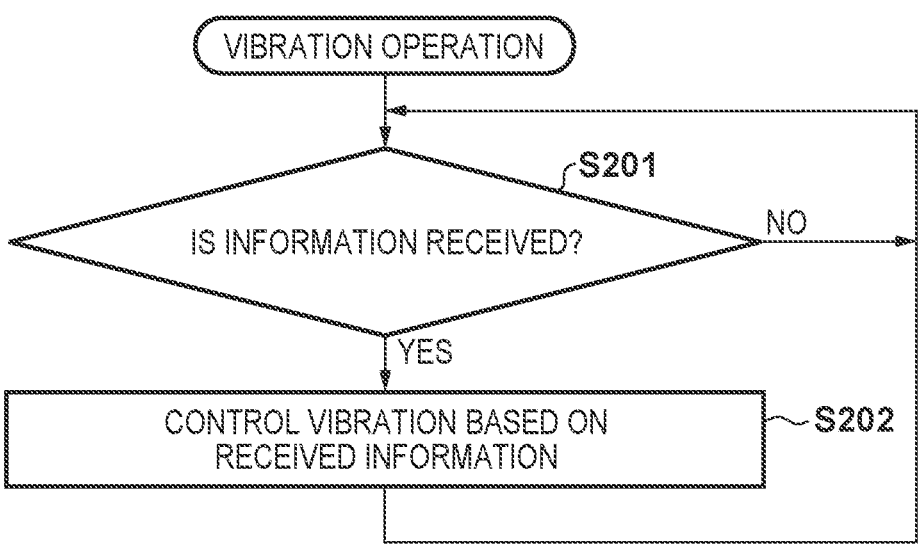

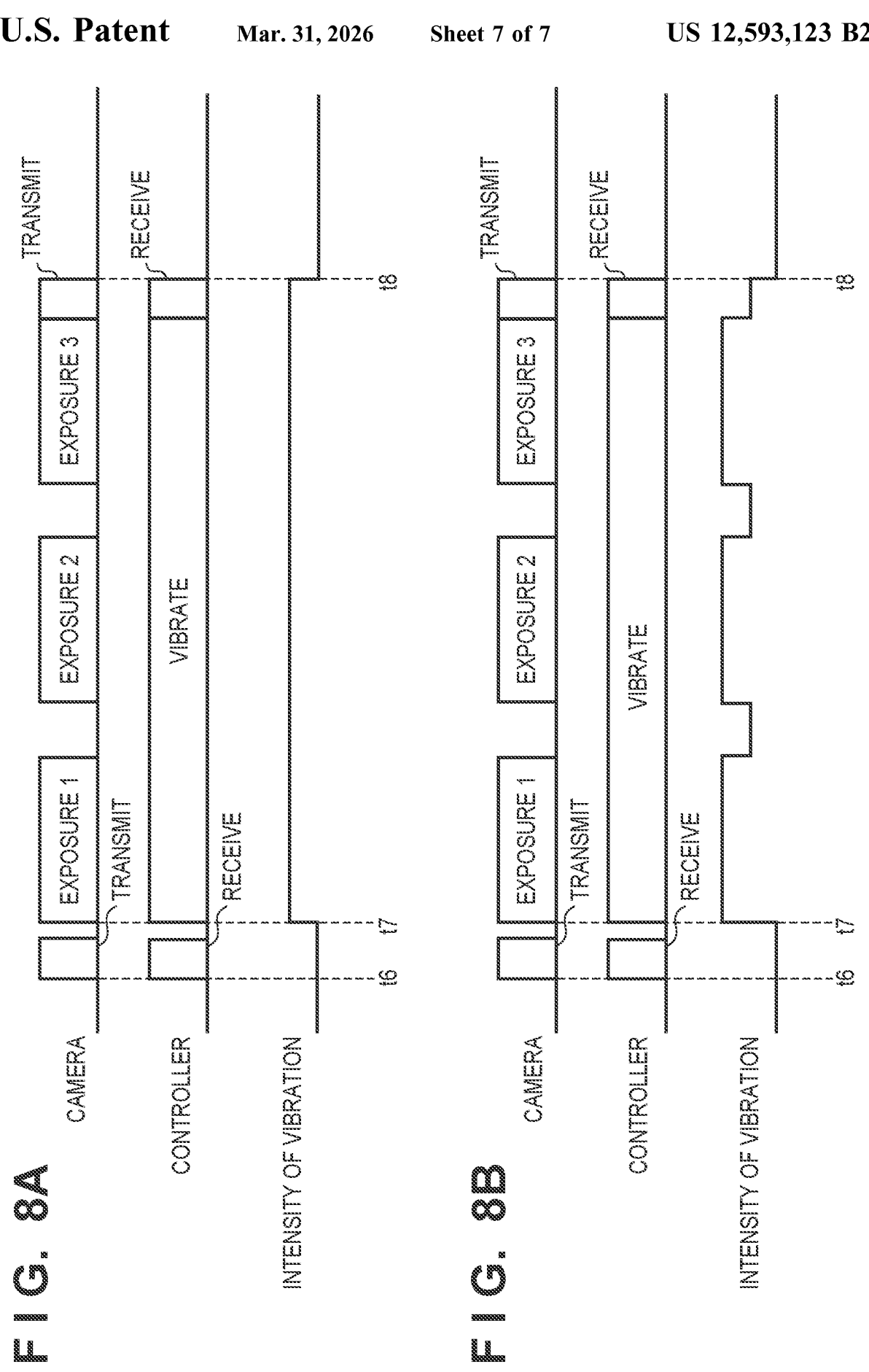
F I G. 8A
F I G. 8B

SYSTEM CONSISTING OF ELECTRONIC DEVICE AND NOTIFICATION APPARATUS, CONTROL METHOD THEREOF, AND ELECTRONIC DEVICE AND NOTIFICATION APPARATUS

BACKGROUND OF THE INVENTION

Field of the Invention

The present invention relates to a system consisting of an electronic device and a notification apparatus, a control method thereof, and an electronic device and a notification apparatus.

Description of the Related Art

Conventionally, a camera equipped with a CMOS sensor, as an image sensor, that can be actuated by a global electronic shutter method is generally known. A CMOS sensor that can be actuated by the global electronic shutter method has the characteristics that it is possible to control the exposure period without using a mechanical shutter, and that it is possible to perform shooting substantially without sound. However, when shooting is performed silently, it is difficult for a user to perceive that shooting has been performed in real time. Therefore, in many image capturing apparatuses, a notification sound is used to notify the user that shooting has been performed.

However, when notification sound is used, it is not possible to take advantage of the fact that shooting can be performed silently in a situation where silence is required, such as during a ceremony. To address this problem, for example, Japanese Patent Laid-Open No. 2019-191435 discloses a camera having a function of notifying the user that a shooting operation has been performed by vibration of a vibrating member in a case where shooting is performed silently.

However, in the technique disclosed in Japanese Patent Laid-Open No. 2019-191435, since the vibration is stopped before the exposure starts, the vibration does not occur during the exposure period. Further, when continuous shooting is performed, the continuous shooting speed (frame speed) is slowed down by the period of vibration.

SUMMARY OF THE INVENTION

The present invention has been made in consideration of the above situation, and notifies the user of accurate shooting timing without slowing down the responsiveness of shooting operation or the continuous shooting speed.

According to the present invention, provided is a system that includes an electronic device and a notification apparatus capable of communicating with the electronic device, wherein the electronic device comprises: an image sensor that performs shooting by controlling an exposure period of performing photoelectric conversion on incident light and accumulating charge by using electronic shutter; and a transmission unit that transmits information indicating at least either of an exposure start timing and an exposure end timing of the image sensor, and the notification apparatus comprises: a reception unit; and a notification unit that performs notification according to at least either of the exposure start timing and the exposure end timing based on the information received by the reception unit.

Further, according to the present invention, provided is an electronic device comprising: an image sensor that performs shooting by controlling an exposure period of performing photoelectric conversion on incident light and accumulating charge by using electronic shutter; and a transmission unit that transmits information indicating at least either of an exposure start timing and an exposure end timing of the image sensor to an external notification apparatus, wherein the external notification apparatus performs notification based on the information transmitted from the transmission unit.

Furthermore, according to the present invention, provided is a notification apparatus comprising: a reception unit that receives information indicating at least either of an exposure start timing and an exposure end timing of an image sensor from an external electric device having the image sensor; and a notification unit that performs notification according to at least either of the exposure start timing and the exposure end timing based on the information received by the reception unit.

Further, according to the present invention, provided is a control method of an electronic device having an image sensor that performs shooting by controlling an exposure period of performing photoelectric conversion on incident light and accumulating charge by using electronic shutter and a notification apparatus capable of communicating with the electronic device, the method comprising: transmitting information indicating at least either of an exposure start timing and an exposure end timing of the image sensor from the electronic device to the notification apparatus, and performing notification in the notification apparatus according to at least either of the exposure start timing and the exposure end timing based on the information transmitted from the electronic device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a flowchart showing shooting processing according to the first embodiment;

FIG. 5 is a flowchart showing vibration control processing of the controller according to the first embodiment;

FIGS. 8A and 8B are timing charts showing timings of shooting and vibration, and vibration control patterns according to the second embodiment.

DESCRIPTION OF THE EMBODIMENTS

Figure 1:
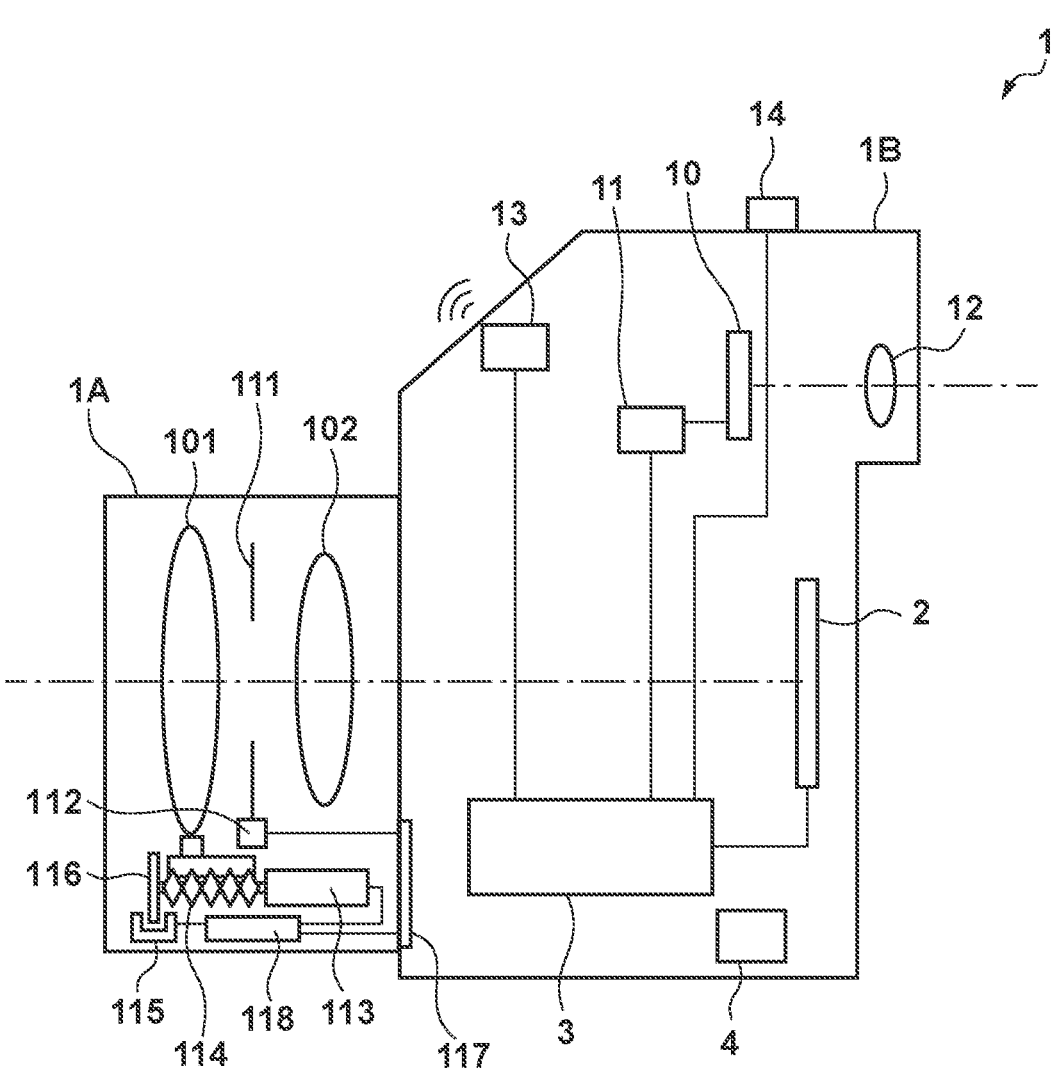
FIG. 1 is a diagram showing a schematic configuration of a camera according to first and second embodiments of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present invention will be described below. In the first embodiment, an image capturing system including an image capturing apparatus and a controller wirelessly connectable to the image capturing apparatus will be described.

First, referring to FIG. 1, a digital still camera 1 (hereinafter referred to as "camera 1") will be described as an example of an image capturing apparatus according to the first embodiment. Note that the image capturing apparatus may be any electronic device having a camera function, and may be, for example, a camera such as a digital video camera, a mobile phone equipped with camera, a computer equipped with camera, a game machine, or the like.

FIG. 1 is a diagram showing a schematic configuration of the camera 1.

In FIG. 1, the camera 1 is mainly composed of a camera body 1B and a lens unit 1A detachable from the camera body 1B.

In the camera body 1B, an image sensor 2 may be composed of, for example, a CMOS image sensor that can be actuated by using the global electronic shutter method, and the exposure period can be controlled by controlling reset scan and readout scan of the global electronic shutter. The image sensor 2 is arranged on the planned imaging plane of the lens unit 1A of the camera 1, accumulates electric charges obtained by photoelectrically converting light incident through the lens unit 1A, converts the electric charges obtained during the exposure period into electric signals, and outputs the electric signals.

A camera CPU 3 controls the entire camera 1. A memory unit 4 records image data obtained by performing image processing on the electric signals output from the image sensor 2 by the camera CPU 3.

A display unit 10 is composed of a liquid crystal display or the like, is actuated by a display unit actuator 11, and displays captured images and the like. An eyepiece lens 12 is arranged in order to observe an image of a subject displayed on the display unit 10.

A camera communication unit 13 is used to communicate with a controller 200, which will be explained later, provided outside the camera body 1B, and is capable of mutual communication with the controller 200.

Connected to a release button 14 are SW1 that is turned on with a first stroke, which is a pushing operation by the user, and SW2 that is turned on with a second stroke, which is a further pushing operation from the ON state of SW1. When SW1 is turned ON, the start of shooting preparations such as photometry, focus adjustment, line-of-sight detection, etc. in the camera 1 is instructed, and when SW2 is turned ON, the start of shooting is instructed. A camera CPU 3 is connected to SW1 and SW2 and can detect the state of the release button 14.

In addition, in this embodiment, by the camera communication unit 13 receiving signals corresponding to SW1 and SW2 transmitted from the controller 200, which will be described later, the shooting preparations and shooting can be performed.

Next, the configuration of the lens unit 1A will be described.

The lens unit 1A includes a focus lens 101, other lenses 102 such as a zoom lens, and a diaphragm 111 as an imaging optical system. Although two lenses are shown in FIG. 1 for the sake of simplification, the lens unit 1A actually includes a larger number of lenses.

The focus lens 101 is actuated by a lens actuation motor 113 and a lens actuation member 114 including a driving gear, and a photocoupler 115 detects rotation of a pulse plate 116 interlocked with the lens actuation member 114 and transmits the information on the rotation to a focus adjustment circuit 118. The focus adjustment circuit 118 actuates the lens actuation motor 113 by a predetermined amount based on this information and information on a lens actuation amount from the camera body 1B to move the focus lens 101 to the in-focus position.

The diaphragm 111 is used to control an amount of incident light and is controlled by a diaphragm actuation unit 112.

A mount contact 117 is an interface between the camera body 1B and the lens unit 1A.

The camera CPU 3 amplifies the luminance component, representing the brightness of the field of view, of the image signal obtained from the image sensor 2 which also serves as a photometric sensor, and then performs logarithmic compression and A/D conversion to calculate luminance information of field of view, thereby determining shooting conditions such as an exposure period.

In addition, camera CPU 3 performs focus detection based on the image signal obtained from the image sensor 2. As a focus detection method based on an image signal obtained from the image sensor 2, there are known a phase difference AF that detects a focus state based on a phase difference if an image signal having parallax can be obtained, and a contrast AF that detects a focus state based on the contrast of the image signal. In this embodiment, either focus detection method may be used.

Next, the controller 200 wirelessly connectable with the camera 1 in FIG. 1 will be described with reference to FIGS. 2 and 3.

Figure 2:
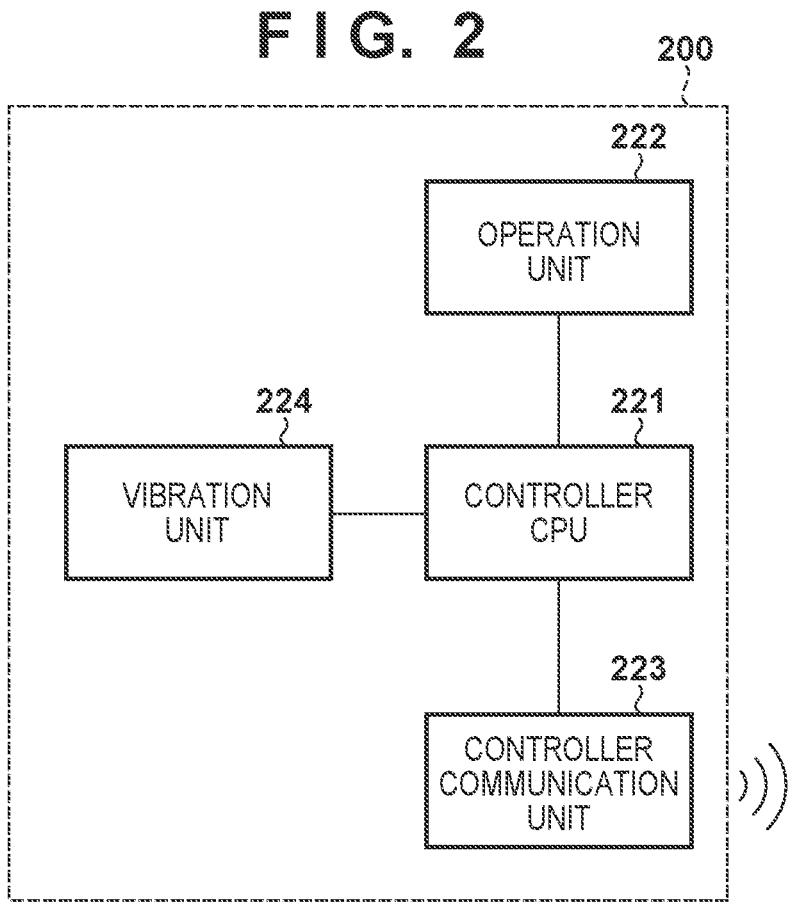
FIG. 2 is a block diagram showing a configuration of a controller according to the first and second embodiments.

As shown in FIG. 2, the controller 200 has a controller CPU 221, an operation unit 222, a controller communication unit 223, and a vibration unit 224.

Figure 3:
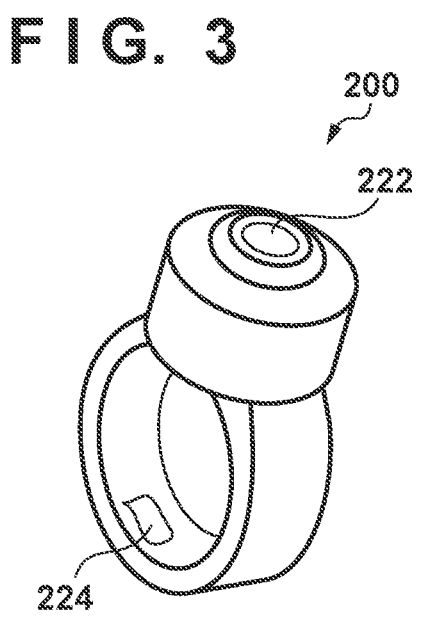
FIG. 3 is a diagram showing an example of a shape of the controller according to the first and second embodiments.

FIG. 3 is a diagram showing an external form of the controller 200. The controller 200 has a ring shape, and has a haptic member as the vibration unit 224 and an optical pad as the operation unit 222. Also, the controller 200 can wirelessly communicate with the camera communication unit 13 via Bluetooth through the built-in controller communication unit 223. The operation unit 222 (optical pad) is capable of pushing button operations of the first stroke and the second stroke in the same way as the release button 14 of the camera 1. Also, by controlling the vibration unit 224, vibration is transmitted to the user. Note that intensity of the vibration and the like can be changed.

Since the controller 200 has the ring shape, the user can operate the camera 1 by wearing the controller 200 on his or her finger, and the vibration unit 224 transmits vibrations to the user during shooting operation in the camera 1. Note that the shape of the controller 200 is not limited to a ring shape, and may be any shape.

Next, the shooting processing of the camera 1 in this embodiment will be described with reference to the flowchart of FIG. 4.

When the camera 1 is powered on, the image sensor 2 is actuated in step S101 to start capturing an image (LV image)

for live view (LV) display, and LV display is started. The camera CPU 3 displays the captured images on the display unit 10.

In step S102, it is determined whether or not the power has been turned off, or whether or not the mode has been changed to a mode other than the shooting mode, such as a playback mode. If the power has been turned off or the mode has been changed to a mode other than the shooting mode, the shooting processing is terminated, whereas if the shooting mode is continued with the power ON, the process proceeds to step S103.

In step S103, main subject detection processing is performed using the LV image. Here, the position of the main subject in the screen is determined by performing human face detection and the like on the LV image obtained in step S101.

In step S104, the camera CPU 3 clears AF_FLAG, which is an internal program control flag, to 0.

In step S105, it is determined whether or not SW1 is turned ON. Here, for example, in a case where SW1 is turned ON by the first stroke operation to the release button 14, or in a case where it is notified from the controller 200 that an operation corresponding to the first stroke to the operation unit 222 is performed, it is determined that SW1 is turned ON. If SW1 is ON, the process proceeds to step S106, and if it is not ON, the process returns to step S101 to repeat the capturing and displaying of the LV image and the main subject detection process.

In step S106, the camera CPU 3 determines the value of AF_FLAG. If AF_FLAG is 0, it indicates a state in which SW1 is ON and an AF operation, which will be described later, has not been performed yet. In this case, the process proceeds to step S107 to perform the AF operation. Here, the camera CPU 3 obtains the focus state of the main subject determined in step S103 based on the image signal output from the image sensor 2 by the known focus detection method described above, and performs control to adjust the position of the focus lens 101. If the in-focus state is reached, AF_FLAG is set to 1, the process proceeds to step S108, where the camera communication unit 13 is controlled to transmit an AF state notification to the controller communication unit 223, and the process proceeds to step S109.

On the other hand, if the AF_FLAG is 1, the AF operation has already been performed and the in-focus state is reached, so the AF operation is skipped and the process proceeds directly to step S109.

In step S109, it is determined whether or not SW2 is turned ON. Here, for example, in a case where SW2 is turned ON by the second stroke operation to the release button 14, or in a case where it is notified from the controller 200 that an operation corresponding to the second stroke to the operation unit 222 is performed, it is determined that SW2 is turned ON. If SW2 is ON, the process proceeds to step S110, and if it is not ON, the process returns to step S105.

In step S110, the camera communication unit 13 is controlled and the shooting conditions are transmitted to the controller 200. The shooting conditions include information such as exposure start timing of the image sensor 2 and an exposure period.

In step S111, the image sensor 2 is actuated to acquire an image, and the image data of the captured image is recorded on a recording medium (not shown). After that, the process returns to step S101.

FIG. 5 is a flowchart for explaining vibration control processing in the controller 200.

In step S201, the controller CPU 221 determines whether or not information such as AF state notification and shooting conditions has been received from the camera 1 via the controller communication unit 223.

The operation of step S201 is repeated until communication information is received from the camera 1. When the information is received, the process proceeds to next step S202.

In step S202, the controller CPU 221 controls the vibration unit 224. At this time, the controller CPU 221 changes the timing and intensity of vibration according to the content of the information received from the camera 1 in step S201.

After that, the process returns to step 201 and shifts to the communication standby state.

Next, the operation timings of the camera 1 and the controller 200 and the vibration control methods will be described with reference to the timing charts of FIGS. 6A to 6C. Although various vibration control methods are conceivable, three methods will be described below.

Figure 6A:
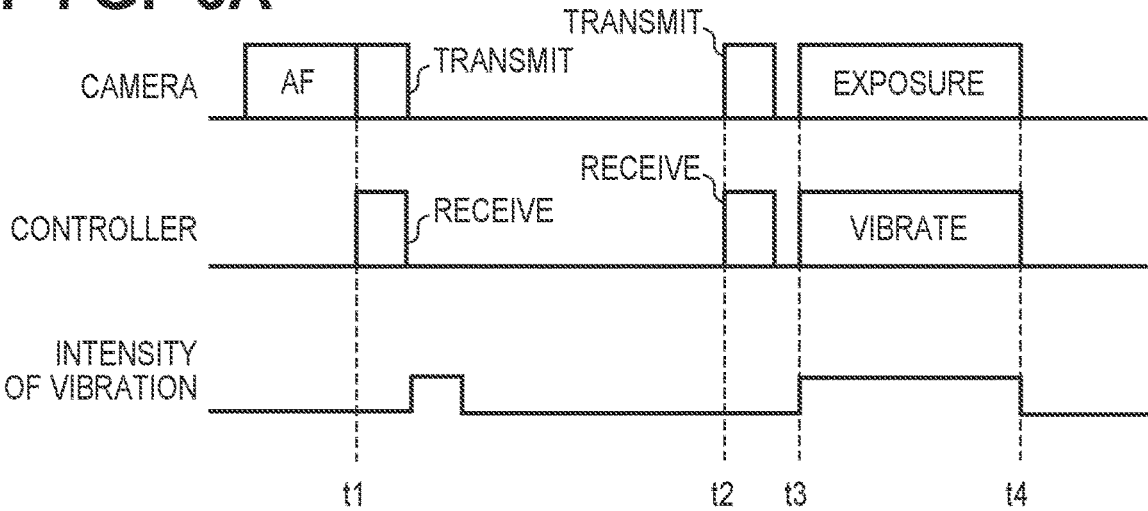
FIGS. 6A to 6C are timing charts showing timings of shooting and vibration, and vibration control patterns according to the first embodiment.

In the method shown in FIG. 6A, at time t1, when the controller 200 receives the AF state notification from the camera 1 through the process of step S108, the vibration unit 224 is controlled to vibrate with a predetermined intensity for a predetermined time in order to notify the user that shooting is ready.

Also, at time t2, the camera CPU 3 transmits the exposure start timing and the exposure period as shooting conditions by the processing of step S110. When the controller 200 receives the shooting conditions, the controller CPU 221 determines the period and intensity of vibration according to the exposure period, and performs vibration control in accordance with the exposure start timing. As a result, vibration control can be performed in synchronization with time t3, which is the exposure start timing of camera 1, and time t4, which is the exposure end timing. Here, the intensity of vibration during the exposure period may be the same as or different from the intensity of the vibration for notifying that the shooting is ready.

Figure 6B:
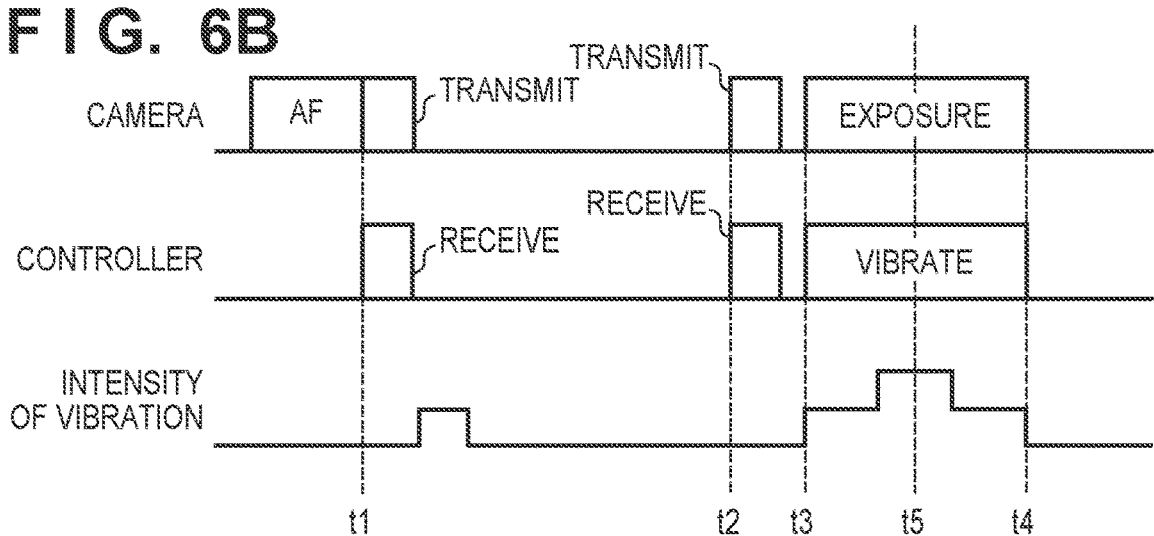

In the example of FIG. 6A, the vibration is controlled with a constant intensity throughout the exposure period from time t3 to time t4, but the intensity may be increased near time t5, which is the center of the exposure period (center of gravity of the exposure period), comparing to the intensity near the start and end of the exposure period as shown in FIG. 6B.

Also, it is not necessary to vibrate continuously during the exposure period, and control to vibrate at least part of the exposure period may be performed.

Figure 6C:
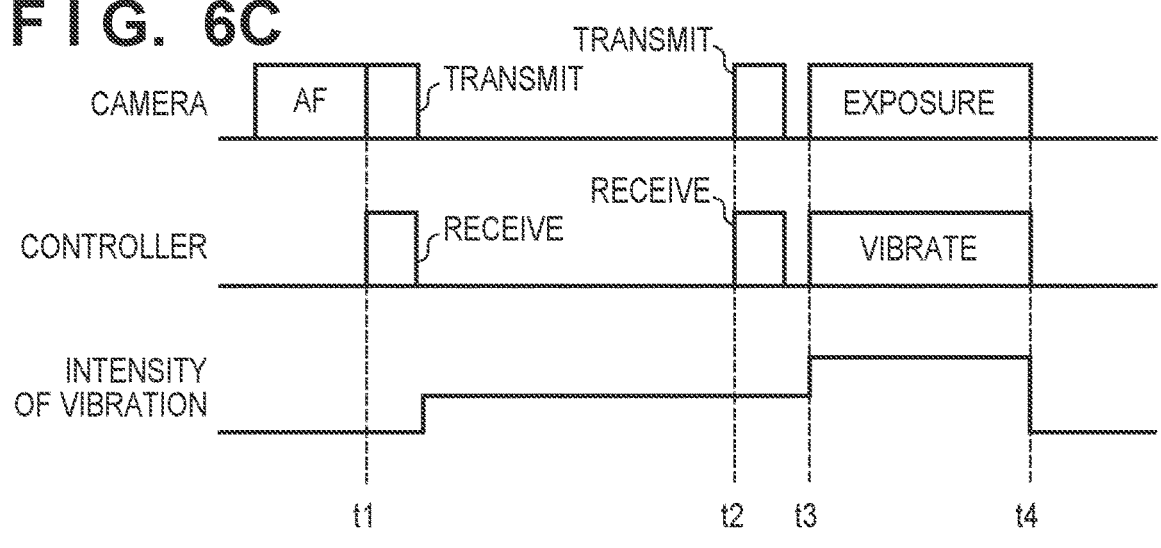

Further, as shown in FIG. 6C, it may be controlled such that vibration continues since AF control is performed and an in-focus state is reached until exposure is started, and the intensity of the vibration may be increased during exposure.

In the example shown in FIGS. 6A to 6C, time t3, which is the exposure start timing, coincides with the start timing of the vibration, however, it is known that there is a gap of several tens of milliseconds between the controller CPU 221 instructs to start vibration and the user actually starts feeling the vibration. Accordingly, considering the delay, vibration may be started prior to time t3, which is the exposure start timing, and ended prior to time t4, which is the exposure end timing.

As described above, according to the first embodiment, the AF completion notification and shooting conditions are transmitted from the camera 1 to the controller 200. Then, the controller 200 controls to vibrate at the timing of receiving the AF completion notification, and also controls to vibrate during the exposure period based on the shooting conditions. As a result, the user can be accurately notified of the shooting timing without the mechanical shutter sound, vibration, or notification sound that accompanies the exposure operation at the time of shooting using the mechanical shutter.

Second Embodiment

The control during continuous shooting operation in the second embodiment of the present invention will be described below with reference to FIGS. 7 to 8B.

The configuration of the camera 1 and the controller 200 wirelessly connectable to the camera 1 in the second embodiment is the same as that described in the first embodiment with reference to FIGS. 1 to 3, and the description thereof is omitted here.

Figure 7:
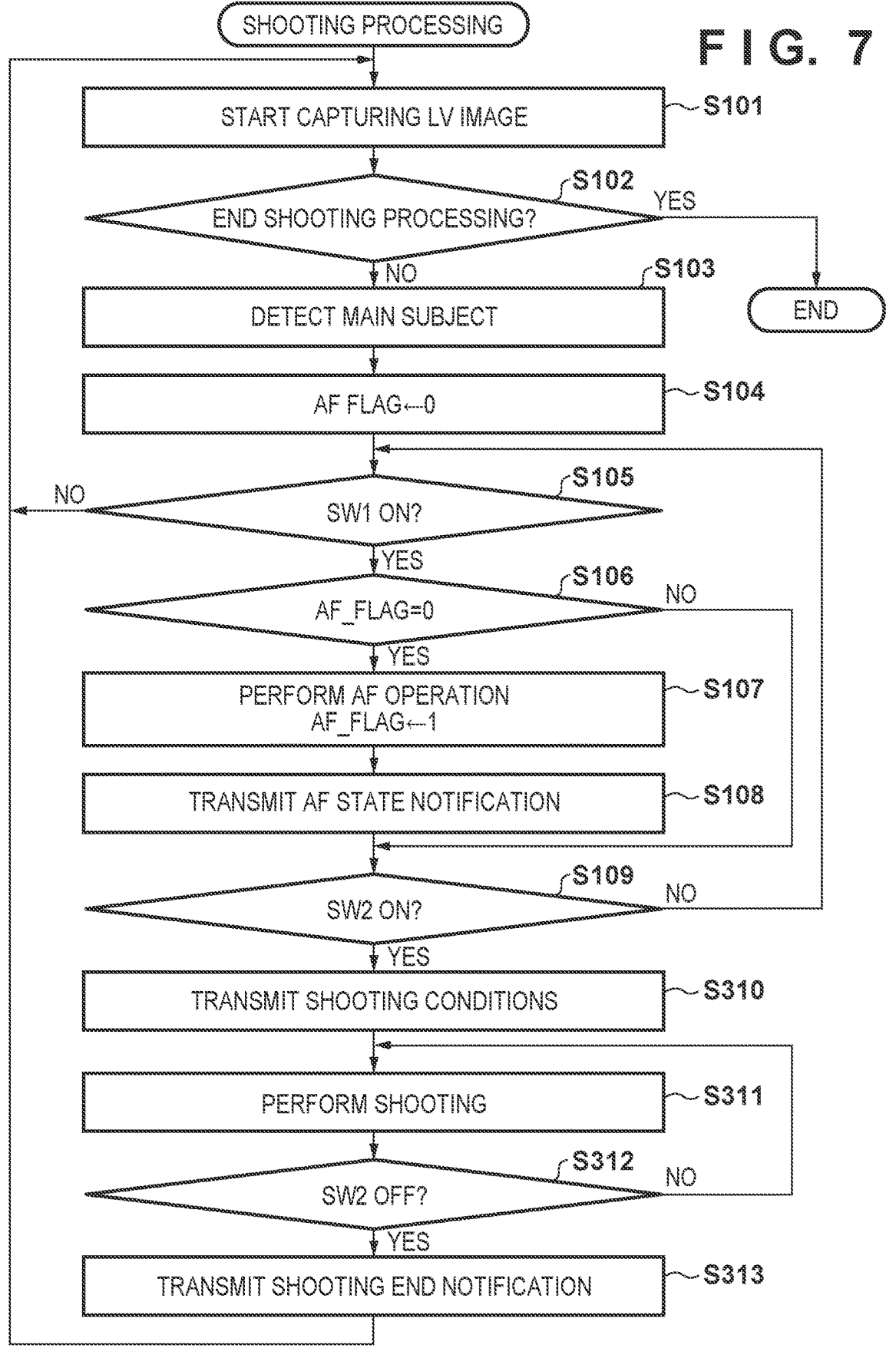
FIG. 7 is a flowchart showing shooting processing according to the second embodiment.

FIG. 7 is a flowchart for explaining continuous shooting processing performed in the camera 1. In FIG. 7, the processes from steps S101 to S109 are the same as the processes from steps S101 to S109 in FIG. 4, so the same step numbers are given and the description thereof is omitted.

If it is determined in step S109 that SW2 is ON, in step S310, the camera communication unit 13 is controlled and the shooting conditions are transmitted to the controller communication unit 223. Unlike step S110 in FIG. 4, the shooting conditions transmitted in step S310 only need to include information on the exposure start timing of the image sensor 2.

The controller CPU 221 receives the information on the exposure start timing, determines the start timing and intensity of vibration, and controls the vibration unit 224 to start vibration at the exposure start timing.

Then, in step S311, the image sensor 2 is actuated to capture an image, and image data of the captured image is recorded in a recording medium (not shown). Thereafter, in next step S312, it is determined whether or not SW2 is OFF. If SW2 is not OFF, the process returns to step S111 to continue the shooting operation (continuous shooting).

When SW2 is turned off, the process proceeds to step S313, the camera CPU 3 controls the camera communication unit 13 to transmit a shooting end notification to the controller 200, and then the process returns to step S301.

Upon receiving the shooting end notification, the controller CPU 221 controls the vibration unit 224 to stop the vibration.

Next, the operation timings of the camera 1 and the controller 200 and the vibration control methods will be described with reference to the timing charts of FIGS. 8A and 8B. Various vibration control methods are conceivable, but two methods will be described below.

In the method shown in FIG. 8A, at time t6, the camera CPU 3 transmits at least the exposure start timing to the controller 200 as the shooting conditions in the process in step S310. Upon receiving the shooting conditions, the controller 200 starts vibration at time t7, which is the exposure start timing of the camera 1.

Then, at time t8, the camera CPU 3 transmits the shooting end notification to the controller 200 in the process of step S313. The controller 200 stops vibration control at time t8 when the reception of the shooting end notification is completed.

In the example shown in FIG. 8A, shooting is performed three times in succession, and vibration is controlled with a constant intensity between times t7 to t8, which is the continuous shooting period. On the other hand, as shown in FIG. 8B, the intensity of vibration may be increased during the exposure period. In this case, the camera CPU 3 transmits the exposure period and the continuous shooting speed (frame rate) as the shooting conditions in addition to the shooting start timing in step S310, so that the controller CPU 221 determines the vibration period and vibration intensity according to the exposure period and the time between frames.

As described above, according to the second embodiment, in the continuous shooting operation, the camera 1 transmits the shooting start timing and the shooting end timing to the controller 200, and the controller 200 controls vibration in accordance with these timings. As a result, it is possible to accurately notify the user of the shooting timing even during continuous shooting.

Modification

In the first embodiment described above, a case has been described in which the user is notified by vibration during the exposure period.

On the other hand, at one of the exposure start timing and the exposure end timing, at least, a notification is given by vibration for a predetermined period. In this case, the controller CPU 221 determines the start or end of the exposure period based on the information on the shooting start timing and the exposure period in step S110 of FIG. 4 described in the first embodiment, or on the information on the shooting start timing obtained in step S310 of the flowchart in FIG. 7 described in the second embodiment.

In this way, by controlling vibration in accordance with at least one of the exposure start timing and the exposure end timing, it is possible to accurately notify the user of the shooting timing.

Also, in the above-described embodiment, the case where the intensity of vibration is changed according to the content of notification has been described, but the present invention is not limited to this, and for example, the pattern of vibration may be changed.

Further, in the above-described embodiment, a haptic member is used as a member for notifying the user, and notification is given by vibration, however, the present invention is not limited to this, and any method capable of performing notification using a device that can communicate with camera 1 may be used. For example, sound or light may be used instead of vibration, and the device may have various shapes in addition to a wearable shape such as an earphone type, a spectacle type, and a bracelet type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-161831, filed Oct. 6, 2022 which is hereby incorporated by reference herein in its entirety.

What is claimed is:

1. A system that includes an electronic device and a notification apparatus capable of communicating with the electronic device, wherein the electronic device comprising:

an image sensor that performs shooting by controlling an exposure period of performing photoelectric conversion on incident light and accumulating charge by using electronic shutter; and one or more processors and/or circuitry which function as a transmission unit that transmits information indicating at least either of an exposure start timing and an exposure end timing of the image sensor, and information indicating the exposure period, and a reception unit that receives the information from the electronic device; and a determination unit that determines intensity of vibration or pattern of vibration for notification according to the exposure period; and a notification unit that performs notification according to at least either of the exposure start timing and the exposure end timing based on the information received by the reception unit for a predetermined period in the exposure period, wherein the notification is performed with the determined intensity of vibration or the determined pattern of vibration.

2. The system according to claim 1, wherein the notification unit performs notification by using at least one of vibration, sound, and light.

3. The system according to claim 1, wherein the notification apparatus has a wearable shape by a user.

4. The system according to claim 1, wherein the transmission unit transmits information indicating the exposure start timing in response to an instruction to perform shooting by the image sensor.

5. The system according to claim 1, wherein the transmission unit transmits information indicating the exposure end timing in response to an instruction to end shooting by the image sensor.

6. The system according to claim 1, wherein the notification unit continuously performs the notification during the exposure period.

7. The system according to claim 6, wherein the notification unit changes the notification performed at a center of the exposure period from the notification performed at the exposure start timing and the exposure end timing.

8. The system according to claim 1, wherein the notification unit starts the notification in synchronization with the exposure start timing and ends the notification in response to reception of information indicating the exposure end timing by the reception unit.

9. The system according to claim 8, wherein the transmission unit further transmits information indicating an exposure period and continuous shooting speed, and the notification unit performs different notification during the exposure period and during a non-exposure period.

10. The system according to claim 1, wherein the transmission unit further transmits information on shooting preparation, performed in response to a shooting preparation instruction, indicating being ready for shooting, and the notification unit performs notification based on the information on the shooting preparation received by the reception unit.

11. The system according to claim 10, wherein the notification unit performs notification such that the notification performed according to at least either of the exposure start timing and the exposure end timing and the notification performed based on the information on the shooting preparation are different from each other.

12. The system according to claim 1, wherein the transmission unit further transmits an exposure period and continuous shooting speed of continuous shooting as shooting condition, and the determination unit determines a period of vibration and intensity of vibration according to the exposure period and a period between frames during the continuous shooting, wherein the intensity of the vibration during the exposure period is greater than the intensity of the vibration during a period other than the exposure period during the continuous shooting.

13. The system according to claim 1, wherein the notification is performed such that the intensity of vibration increases at a center of the exposure period.

14. A control method of an electronic device having an image sensor that performs shooting by controlling an exposure period of performing photoelectric conversion on incident light and accumulating charge by using electronic shutter and a notification apparatus capable of communicating with the electronic device, the method comprising:

transmitting information indicating at least either of an exposure start timing and an exposure end timing of the image sensor and information indicating the exposure period from the electronic device to the notification apparatus;

receiving the information from the electronic device in the notification apparatus;

determining intensity of vibration or pattern of vibration for notification according to the exposure period; and performing notification in the notification apparatus according to at least either of the exposure start timing and the exposure end timing based on the information transmitted from the electronic device for a predetermined period in the exposure period, wherein the notification is performed with the determined intensity of vibration or the determined pattern of vibration.

\* \* \* \* \*